United States Patent [19]

Ohno et al.

[11] Patent Number: 4,546,006
[45] Date of Patent: Oct. 8, 1985

[54] METHOD FOR STRENGTHENING PORCELAIN TOOTH

[75] Inventors: Koji Ohno, Tokyo; Nobukazu Ohi, Fuchu; Syohei Hayashi, Tokyo, all of Japan

[73] Assignee: G-C Dental Industrial Corp., Tokyo, Japan

[21] Appl. No.: 650,543

[22] Filed: Sep. 14, 1984

[30] Foreign Application Priority Data

Jan. 26, 1984 [JP] Japan .................................. 59-011035

[51] Int. Cl.$^4$ ........................... C09K 3/00; A01N 1/02
[52] U.S. Cl. ............................................ 427/2; 106/35;
427/224; 427/376.1; 433/202.1; 433/212.1; 433/217.1
[58] Field of Search ............. 427/2, 299, 376.1, 372.2, 427/224; 433/202, 212, 217; 106/35

[56] References Cited

U.S. PATENT DOCUMENTS

| 4,120,729 | 10/1978 | Smyth et al. | 433/202 X |
| 4,235,633 | 11/1980 | Tomioka et al. | 106/177 X |
| 4,362,510 | 12/1982 | Brauer et al. | 433/217 X |

Primary Examiner—Michael R. Lusignan
Attorney, Agent, or Firm—Oblon, Fisher, Spivak, McClelland & Maier

[57] ABSTRACT

A method for strengthened porcelain tooth is disclosed, which comprises depositing one or more inorganic salts of metals selected from rubidium, cesium, and potassium on the surface of a porcelain tooth obtained by sintering a dental porcelain material containing feldspar as a main raw material and sodium, and heat treating the porcelain tooth at temperature of 380° C. or higher but lower than the melting point of the inorganic salt and the strain temperature of the porcelain tooth. According to the method of this invention, the porcelain tooth can be strengthened with ease while maintaining translucency and color tone as in a natural tooth, without using any special device.

4 Claims, No Drawings

METHOD FOR STRENGTHENING PORCELAIN TOOTH

FIELD OF THE INVENTION

This invention relates to a method for strengthening porcelain tooth used for the dental restoration.

BACKGROUND OF THE INVENTION

In the dentistry, various dental restorative materials are used for restorating a deficit after medically treating caries of a natural tooth, etc. Among them, a porcelain tooth obtained by sintering a high-fusing dental porcelain material made of, as a main raw material, feldspar (hereinafter simply referred to as "dental porcelain material") at 1200° C. to 1300° C. is not only chemically stable but also has translucency and color tone well matched with a natural tooth and hence, it has hitherto been widely used.

However, when such a porcelain tooth is set and fixed in the mouth and is applied with external forces by, for example, mastication, etc., it often breaks. In order to solve such a problem, various attempts to increase the strength of the porcelain tooth have been made but not yet reached satisfactory effects. For example, an attempt to provide a porcelain tooth by adding a crystal of high purity alumina to a dental porcelain material and then firing had the following problems. Namely, in order that the porcelain tooth reproduces color tone as in a natural tooth, the porcelain tooth must be prepared by firing several porcelain materials having different colors in the multilayered form. In this case, if the alumina crystal is present in the outer layer thereof, the translucency and color tone as in a natural tooth are lost. Accordingly, nevertheless it is desired to particularly reinforce the outer layer because it is applied directly with an external force, the alumina crystal cannot be present in any other layers than the inner layer. Such a porcelain tooth in which a crystal of alumina is preset only in the inner layer is slightly improved in the strength, which is not yet satisfactory, however. Under such a background, development of a method for thoroughly strengthening the porcelain tooth while maintaining translucency and color tone as in a natural tooth has been demanded in the field of dental restoration.

In order to meet such a demand, the inventors have extensively investigated and finally found that when after firing, a porcelain tooth is deposited with a specified inorganic salt of metal and then heated at a specified temperature, the porcelain tooth can be thoroughly strengthened in the non-molten state of the inorganic salt, thereby achieved this invention.

SUMMARY OF THE INVENTION

An object of this invention is to provide a method for strenthening porcelain tooth which enables one to easily strengthen a porcelain tooth after the firing while maintaining translucency and color tone as in a natural tooth without using any special device.

In other words, this invention relates to a method for strengthening porcelain tooth comprising depositing one or more than two inorganic salts of metals selected from rubidium, cesium, and potassium on the surface of a porcelain tooth obtained by firing a dental porcelain material containing feldspar as a main raw material and sodium, and heat-treating the porcelain tooth at temperatures of 380° C. or higher but lower than the melting point of the inorganic salt and the strain temperature of the porcelain tooth.

DETAILED DESCRIPTION OF THE INVENTION

A porcelain tooth to which the method of this invention is subjected is a generally and widely used porcelain tooth obtainable by sintering a dental porcelain material containing feldspar as a main raw material and sodium at 1200° C. to 1300° C. A general method for the manufacturing process of the porcelain tooth is explained below. The dental porcelain material comprises as a raw material, feldspar-quartz or feldspar-quartz-kaolin, and is produced by sintering the raw material at about 1300° C. and then cooling for solidification, followed by crushing. As the feldspar used as a main component, potash feldspar is preferably used from the viewpoint of luster of the resulting porcelain tooth. The potash feldspar is represented by the chemical formula, $K_2O.Al_2O_3.6SiO_2$ and constitutes mainly a vitreous part of the porcelain tooth. The quartz is mainly composed of silicon oxide and has a high melting point of 1800° C. and therefore, is used for the purpose of increasing the strength. The kaolin is a mineral composed of, as main components, aluminum oxide and silicon oxide and is used for the purpose of increasing dimensional stability during the firing. In order to adjust the firing temperature at low temperatures, $Na_2O$ is added. In general, $Na_2O$ is present as an impurity in feldspar and therefore, even though $Na_2O$ is not added, the dental porcelain material can generally contain $Na_2O$. The thus produced dental porcelain material is filled in a mold and formed into various shapes so as to imitate a natural tooth. Thereafter, the molded porcelain material is taken out from the mold and fired at the above described temperature. After the firing, a porcelain tooth having a structure wherein a crystal of α-quartz is present in the vitreous part thereof is obtained. A porcelain tooth generally expands or shrinks upon heating or cooling. When it is subjected to rapid heating or quenching, it generally causes a difference in the expansion amount or shrinkage amount due to the temperature difference between the surface portion and interior portion thereof. A stress is thus generated and results in occurence of fine cracks or even breakage. Accordingly, it is preferred that the porcelain tooth has a coefficient of thermal expansion of $15 \times 10^{-6}$/°C. or less.

The porcelain tooth thus obtained by sintering the dental porcelain material containing feldspar as a raw material and sodium is strengthened in accordance with the method of this invention in the following manner. (The method of this invention may hereinafter be referred to as "strengthening treatment".) Namely, one or more inorganic salts of metals selected from rubidium, cesium, and potassium (the inorganic salt may hereinafter be referred to as "strengthening inorganic metal salt") is deposited on the surface of the porcelain tooth, and the resulting porcelain tooth is heat treated at temperatures of 380° C. or higher but lower than the melting point of the inorganic salt and the strain temperature of the porcelain tooth (a temperature at which the viscosity is $10^{14.5}$ poises). By this heat treatment ion exchange occurs between the sodium ion in the porcelain tooth and the rubidium ion, cesium ion, or potassium ion in the strengthening inorganic metal salt deposited thereon. The size of the sodium ion is 1.9 Å, whereas the size of the potassium ion, rubidium ion, and cesium ion is 2.66 Å, 2.96 Å, and 3.38 Å, respectively, the latter values being larger than that of the sodium ion. Thus a stress generates on the surface of the porcelain tooth because of the occurrence of ion exchange, and the thus generated stress remains as a compressive stress even after the cooling of the porcelain tooth, whereby the porcelain tooth is strengthened. Though a lithium ion also undergoes the ion exchange with the sodium ion, since its size is 1.2 Å, which is smaller than that of the sodium ion, it cannot generate the compressive stress. Accordingly, the lithium ion is not employable in the invention.

In the method of this invention, the heat treatment for depositing a strengthening inorganic metal salt containing an ion which has such a strengthening effect on the surface of a porcelain tooth is carried out at temperatures of 380° C. or higher, whereby ion exchange can be thoroughly achieved by the heat treatment at a temperature lower than the melting point of the strengthening inorganic metal salt, i.e., in the non-molten state thereof. In the method of this invention, an organic compound is not employable as a compound containing an ion which has such a strengthening effect because it is likely to decompose at temperatures of 380° C. or higher.

Accordingly, the strengthening inorganic metal salt which can be used in the method of this invention is an inorganic salt of rubidium, cesium, or potassium, having a melting point of 380° C. or higher. Specific examples includes rubidium carbonate (m.p. 837° C.), rubidium chloride (m.p. 717° C.), cesium chloride (m.p. 645° C.), potassium carbonate (m.p. 891° C.), and potassium chloride (m.p. 776° C.). Further, rubidium sulfate (m.p. 1060° C.), cesium sulfate (m.p. 1010° C.), potassium sulfate (m.p. 1069° C.), potassium tertiary phosphate (m.p. 1340° C.), and potassium pyrophosphate (m.p. 1100° C.) can also be used. But the strengthening inorganic metal salt which can be used in the method of this invention is not limited to these exemplified inorganic salts. The strengthening inorganic metal salt can be used either alone or in admixture of two or more thereof.

In depositing the strenghtening inorganic metal salt on the porcelain tooth, the strengthening inorganic metal salt is dissolved or dispersed in a depositing liquid such as water or an oil, to which a small amount of an organic binder is futher added as an auxiliary agent for promoting the deposition, if desired, to prepare a solution or slurry (for example, 90 g of potassium tertiary phosphate is dissolved in 100 cc of water, and 1 g of gum arabic is further added thereto), the solution or slurry is sprayed or coated on the porcelain tooth in a dry thickness of 2 to 5 mm, and the resulting porcelain tooth is pre-heated for drying such that the depositing liquid does not cause rapid boiling, etc. during the heat treatment for strengthening. In the method of this invention, the use of such depositing liquid and a small amount of organic binder does not provide any harm.

The porcelain tooth onto which the strengthening inorganic metal salt has been deposited is heat treated at temperatures of 380° C. or higher. With respect to the heat treatment temperature, the effect becomes greater as the temperature increases if the temperature is lower than the melting point of the strengthening inorganic metal salt. On the other hand, if the temperature is higher than the strain temperature of the porcelain tooth fired from the dental porcelain material, though the ion exchange undergoes the heat treatment, a compressive stress is not generated on the surface of the porcelain tooth, or even though the compressive stress would be generated, since it is relaxed the remaining compressive stress is so weak that the strengthening cannot be thoroughly achieved. Thus the heat treatment temperature is 380° C. or higher but lower than the melting point of the strengthening inorganic metal salt and the strain temperature of the porcelain tooth. The heat treatment time is generally sufficient within the range of from 5 minutes to 60 minutes, but a time longer than 60 minutes is also acceptable. No special device is required to be used as apparatus for the heat treatment but an electric furnace generally used by a dental technician can be used.

The thus heat treated porcelain tooth is finished by cooling and if desired, washing with water or other means. There can be thus obtained a strengthened porcelain tooth in accordance with the method of this invention.

The method of this invention enables one to thoroughly strengthen a porcelain tooth by depositing on the porcelain tooth a strengthening inorganic metal salt containing rubidium, cesium, or potassium and having a melting point of 380° C. or higher and heat treating the porcelain tooth at temperatures of 380° C. or higher but at least lower than the melting point of the strengthening inorganic metal salt, to thereby cause ion exchange of the strengthening inorganic metal salt with a sodium ion of the porcelain tooth to be deposited in the non-molten state of the strengthening inorganic metal salt. Further, the thus obtained strengthened porcelain tooth is prevented from the occurrence of dropping or movement of the strengthening inorganic metal salt deposited from the porcelain tooth upon melting and liquefying, and even a small amount of the strengthening inorganic metal salt used effectively contributes to the ion exchange, whereby it becomes possible to use a strengthening inorganic metal salt with good efficiency. Still further, the method of this invention can be accomplished by a simple heat treatment after the deposition by spraying or coating, without need of using any special device, whereby the porcelain tooth can be strengthened while maintaining translucency and color tone as in a natural tooth.

The invention is further explained in detail by reference to the following Examples and comparative Examples.

A dental porcelain material used in these examples had a coefficient of thermal expansion of $8 \times 10^{-6}/°C$. and a strain temperature of 1000° C. and had the following chemical composition.

$SiO_2$: 72 wt %
$Al_2O_3$: 17 wt %
$K_2O$: 7 wt %
$Na_2O$: 3 wt %
Others: 1 wt %

The dental porcelain material was mixed with water to form a slurry. The slurry was then filled in a mold for molding and fired at about 1270° C., followed by correcting the shape thereof. The resulting material was further fired at 1290° C. to obtain a columnar fired material having a diameter of 8 mm and a thickness of 4 mm and having translucency and color tone as in a natural tooth. The thus obtained fired material was provided for the Examples and Comparative Examples.

EXAMPLES 1 TO 8

Onto the fired material was coated a mixed slurry of each of various strengthening inorganic metal salts as shown in Table 1 below and a vegetable oil and then preheated to volatilize the vegetable oil, whereby the strengthening inorganic metal salt was deposited in a thickness of about 5 mm on the fired material. Thereafter, a heat treatment was carried out under the condition as shown in Table 1, and the excessive strengthening inorganic metal salt was removed by washing with water. There was thus obtained a strengthened fired product in accordance with the method of this invention.

With respect to the thus obtained strengthened fired product, a compression testing was performed in a manner as explained below to obtain a diametral tensile strength. Namely, the columnar strengthened fired product was set up in a compressive tester and compressed at a rate of 1 mm/min in a diametrical direction until it was broken. A load applied at the breakage was measured, and the diametral tensile strength was calculated by the following equation:

$$\text{diametral tensile strength} = 2P/(\pi \cdot d \cdot l)$$

wherein P is the load applied at the breakage; d is the diameter of the fired product; l is the thickness of the fired product; and $\pi$ is the circular constant.

The above described method for the measurement of the diametral tensile strength is a method widely used as the method for measuring the strength of brittle materials, such as glass, ceramics, and concrete, etc., which have a high strength against the compressive force but a low strength against the tensile force.

The results obtained are shown in Table 1. The translucency and color tone of the fired product (before the strengthening treatment) as in a natural tooth were maintained as they stood even after the strengthening treatment.

COMPARATIVE EXAMPLES 1 TO 3

The same testing procedures as in Examples 1 to 8 were followed except that a fired material without having been subjected to the strengthening treatment was used as it stood (Comparative Example 1), or fired products obtained by the heat treatment using the same strengthening inorganic metal salt, potassium tertiary phosphate as in Examples 4, 6, 7, and 8 under the condition as shown in Table 1, which is outside the scope of the invention, were used (Comparative Examples 2 and 3). Thus a diametral tensile strength was measured. The results obtained are also shown in Table 1.

TABLE 1

| Example or Comparative Example No. | Strengthening Inorganic Metal Salt | Heat Treatment Temperature (°C.) | Heat Treatment Time (min) | Diametral Tensile Strength (kg/cm²) |
|---|---|---|---|---|
| Ex. 1 | Rubidium Carbonate | 700 | 5 | 780 |
| Ex. 2 | Rubidium Sulfate | 700 | 5 | 700 |
| Ex. 3 | Cesium Sulfate | 700 | 5 | 600 |
| Ex. 4 | Potassium Tertiary Phosphate | 700 | 5 | 680 |
| Ex. 5 | Rubidium Sulfate (50 wt %) + Cesium Sulfate (50 wt %) | 500 | 5 | 600 |
| Ex. 6 | Potassium Tertiary Phosphate | 400 | 10 | 630 |
| Ex. 7 | Potassium Tertiary Phosphate | 500 | 10 | 660 |
| Ex. 8 | Potassium Tertiary Phosphate | 700 | 30 | 730 |
| Com. Ex. 1 | — | — | — | 450 |
| Com. Ex. 2 | Potassium Tertiary Phosphate | 300 | 10 | 530 |
| Com. Ex. 3 | Potassium Tertiary Phosphate | 1100 | 5 | 550 |

It is clear from Table 1 that the diametral tensile strength of the fired products strengthened by the method of this invention greatly increases to 600 to 780 kg/cm² as compared with that (450 kg/cm²) of the fired material before the treatment. Such an effect can be provided by not only a single use of the strengthening inorganic metal salt but also a combined use of two or more thereof as in Example 5. Further, when the treatment time is concerned, the effect in Example 8 (treatment time: 30 minutes) is greater than that in Example 4 (treatment time: 5 minutes), and when a comparison is made among Examples 6, 7, and 4 while taking into account the above fact, it can be understood that the effect becomes greater as the temperature increases within the range defined in this invention. Moreover, as is clear from the comparison between Examples 4 and 6 to 8 and Comparative Example 1 and Comparative Examples 2 and 3, in the case that the heat treatment temperature is higher than 1000° C. which is the strain temperature of the porcelain tooth (i.e., the dental porcelain material) or lower than 380° C., it cannot be said that the strength of the resulting porcelain tooth is thoroughly improved as compared with that of the porcelain tooth having not been subjected to the strengthening treatment. Thus it can be understood that in order to thoroughly strengthen the porcelain tooth, the heat treatment temperature must be 380° C. or higher but lower than the strain temperature of the porcelain tooth. In practicing the Examples, an electric furnace for a dental technician was used, but use of a special device was not needed.

The method of this invention gives rise to an effect for strengthening a porcelain tooth with ease while maintaining translucency and color tone as in a natural tooth by subjecting a strengthening inorganic metal salt having a melting point of 380° C. or higher, deposited on the porcelain tooth, to ion exchange in the tooth in the non-molten state thereof, whithout using any special device. Accordingly, this invention can greatly contribute to the dental treatment.

While the invention has been described in detail and with reference to specific embodiments thereof, it will be apparent to one skilled in the art that various changes and modifications can be made therein without departing from the spirit and scope thereof.

What is claimed is:

1. A method for strengthening porcelain tooth comprising depositing one or more inorganic salts of metals selected from rubidium, cesium, and potassium on the surface of a porcelain tooth obtained by sintering a dental porcelain material containing feldspar as a main raw material and sodium, and heat treating the porcelain tooth at temperatures of 380° C. or higher but lower than the melting point of said inorganic salt and the strain temperature of said porcelain tooth.

2. A method for strengthening porcelain tooth as claimed in claim 1, wherein said porcelain tooth has a coefficient of thermal expansion of $15 \times 10^{-6}$/°C. or less.

3. A method for strengthening porcelain tooth as claimed in 1, wherein said porcelain tooth on which said inorganic salt of metal has been deposited is treated for from 5 minutes to 60 minutes.

4. A method for strengthening porcelain tooth as claimed in claim 2, wherein said porcelain tooth on which said inorganic salt of metal has been deposited is treated for from 5 minutes to 60 minutes.

* * * * *